United States Patent
Zhou et al.

(10) Patent No.: US 11,874,587 B2
(45) Date of Patent: Jan. 16, 2024

(54) PROJECTION IMAGE ANTI-JITTER METHOD AND APPARATUS, AND PROJECTOR

(71) Applicant: IVIEW DISPLAYS (SHENZHEN) COMPANY LTD., Shenzhen (CN)

(72) Inventors: Ziguang Zhou, Shenzhen (CN); Steve Yeung, Hong Kong (CN); Zhiqiang Gao, Hong Kong (CN); Augustus Yeung, Hong Kong (CN); Mingnei Ding, Shenzhen (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 103 days.

(21) Appl. No.: 17/530,842

(22) Filed: Nov. 19, 2021

(65) Prior Publication Data

US 2022/0075244 A1    Mar. 10, 2022

Related U.S. Application Data

(63) Continuation of application No. PCT/CN2019/129516, filed on Dec. 28, 2019.

(30) Foreign Application Priority Data

Jun. 19, 2019    (CN) .......................... 201910532262.5

(51) Int. Cl.
*G03B 21/14*    (2006.01)
*G02B 13/16*    (2006.01)

(52) U.S. Cl.
CPC .......... *G03B 21/147* (2013.01); *G02B 13/16* (2013.01); *G03B 21/142* (2013.01)

(58) Field of Classification Search
CPC ...... H04N 9/315; H04N 9/317; H04N 9/3185; H04N 9/3194; G03B 21/008; G03B 21/28; G03B 21/142; G03B 21/147; G03B 21/206; G03B 21/208; G03B 13/16; G03B 13/20; G03B 13/26; G02B 27/642; G02B 27/644; G02B 27/646
See application file for complete search history.

(56) References Cited

U.S. PATENT DOCUMENTS

| | | | | |
|---|---|---|---|---|
| 2005/0099607 A1* | 5/2005 | Yokote | ................... | H04N 9/317 353/43 |
| 2008/0309772 A1 | 12/2008 | Ikeda | | |
| 2011/0181636 A1* | 7/2011 | Fukazawa | ............ | G03B 21/145 359/557 |
| 2017/0285361 A1* | 10/2017 | Ito | ......................... | G02B 27/646 |
| 2017/0289533 A1* | 10/2017 | Ono | .................... | G06F 3/04883 |

(Continued)

FOREIGN PATENT DOCUMENTS

| CN | 102540627 A | 7/2012 |
|---|---|---|
| CN | 204595408 U | 8/2015 |
| CN | 105629643 A | 6/2016 |

(Continued)

*Primary Examiner* — Sultan Chowdhury
(74) *Attorney, Agent, or Firm* — IPRO, PLLC

(57) ABSTRACT

Embodiments of the present disclosure, provide a projection image anti jitter method and apparatus, and a projector. With the projection image anti jitter method, jitter data of a projection lens is captured; jitter characteristic information and offset data are acquired by calculation; and the projection image is adjusted based on the offset data.

6 Claims, 3 Drawing Sheets

(56) References Cited

U.S. PATENT DOCUMENTS

2017/0299883 A1* 10/2017 Nonaka ................ G03B 21/142
2019/0087946 A1* 3/2019 Chiba ...................... H04N 5/74

FOREIGN PATENT DOCUMENTS

| CN | 105681674 A | 6/2016 |
| CN | 105934708 A | 9/2016 |
| CN | 110324594 A | 10/2019 |

* cited by examiner

PROJECTION IMAGE ANTI-JITTER METHOD AND APPARATUS, AND PROJECTOR

This application is based upon and claims priority to Chinese Patent Application No. 2019105322625, filed before China National Intellectual Property Administration on Jun. 19, 2019 and entitled "PROJECTION IMAGE ANTI-JITTER METHOD AND APPARATUS, AND PROJECTOR" the entire contents of which are incorporated herein by reference.

TECHNICAL FIELD

The present disclosure relates to the technical field of projection display, and in particular, relates to a projection image anti jitter method and apparatus, and a projector.

BACKGROUND

With increasingly wide application of projectors in all walks of life and various scenarios in recent years, customers are imposing higher and higher requirements for practical application and convenience of use of the projectors. Hand-held projectors have the advantages of portability, diversification, multiple applications, and low price, and may achieve image projection anytime and anywhere in various environments such as indoors or outdoors. Therefore, the hand-held projector is becoming more and more popular, and application thereof is becoming more and more diversified, such that more and more users like to use the hand-held projector to project images.

During practice of the present disclosure, the inventors have found that the above related technologies at least have the following problems: when an existing hand-held projector is held by hands for projection, a projected image will jitter up and down, and left and right due to poor anti jitter processing or no anti jitter processing. In addition, the jitter of a device causes a blurred projected image, exerts an adverse impact on the image, and impairs user's viewing.

SUMMARY

With respect to the above defects in the related art, objectives of the present disclosure are to provide a projection image anti jitter method and apparatus, and a projector.

The objectives of the present disclosure are achieved by employing the following technical solutions:

In a first aspect, embodiments of the present disclosure provide a projection image anti jitter method. The method includes:
 capturing jitter data of a projection lens;
 acquiring jitter characteristic information by calculation based on the jitter data;
 acquiring offset data of the projection lens based on the jitter characteristic information; and
 adjusting the projection lens based on the offset data.

In some embodiments, capturing the jitter data of the projection lens specifically includes:
 capturing an acceleration and an angular velocity of jitter of the projection lens using a six-axis sensor.

In some embodiments, acquiring the jitter characteristic information by calculation based on the jitter data specifically includes:
 acquiring a variation parameter of an Euler angle of the projection lens by calculation based on the acceleration and the angular velocity; wherein
 the variation parameter of the Euler angle includes a yaw angle, a pitch angle, and a roll angle that are variable with time.

In some embodiments, acquiring the offset data of the projection lens based on the jitter characteristic information specifically includes:
 mapping the variation parameter of the Euler angle to pixel point information; and
 determining, based on the pixel point information, whether the projection lens jitters; wherein
 the pixel point information includes a movement direction and a pixel point value of the pixel point, the pixel point value being a distance by which the pixel point moves.

In some embodiments, mapping the variation parameter of the Euler angle to the pixel point information specifically includes:
 mapping a variation parameter of the yaw angle to information of a first pixel point movable in an X axis;
 mapping a variation parameter of the pitch angle to information of a second pixel point movable in a Y axis; and
 mapping a variation parameter of the roll angle to information of a third pixel point movable in a Z axis.

In some embodiments, determining, based on the pixel point information, whether the projection lens jitters specifically includes:
 setting a maximum pixel point threshold;
 determine whether the pixel point value exceeds the maximum pixel point threshold; and
 determine that the projection lens is in a jitter state in response to the pixel point value exceeding the maximum pixel point threshold.

In some embodiments, adjusting the projection lens based on the offset data specifically includes:
 driving the projection lens to adjust the pixel point value along a direction opposite to the movement direction of the pixel point.

In a second aspect, embodiments of the present disclosure provide a projection image anti jitter apparatus. The apparatus includes:
 a capturing unit, configured to capture jitter data of a projection lens;
 a calculating and analyzing unit, configured to acquire jitter characteristic information by calculation based on the jitter data, and acquire offset data of the projection lens based on the jitter characteristic information; and
 a driving unit, configured to adjust the projection lens based on the offset data.

In some embodiments, the capturing unit is specifically configured to:
 capture an acceleration and an angular velocity of jitter of the projection lens using a six-axis sensor.

In some embodiments, the calculating and analyzing unit is specifically configured to:
 acquire a variation parameter of an Euler angle of the projection lens by calculation based on the acceleration and the angular velocity; wherein
 the variation parameter of the Euler angle includes a yaw angle, a pitch angle, and a roll angle that are variable with time.

In some embodiments, the calculating and analyzing unit is further specifically configured to:
 map the variation parameter of the Euler angle to pixel point information; and
 determine, based on the pixel point information, whether the projection lens jitters; wherein the pixel point information includes a movement direction and a pixel point value of the pixel point, the pixel point value being a distance by which the pixel point moves.

In some embodiments, mapping the variation parameter of the Euler angle to the pixel point information specifically includes:

mapping a variation parameter of the yaw angle to information of a first pixel point movable in an X axis;

mapping a variation parameter of the pitch angle to information of a second pixel point movable in a Y axis; and mapping a variation parameter of the roll angle to information of a third pixel point movable in a Z axis.

In some embodiments, the calculating and analyzing unit is further specifically configured to:

set a maximum pixel point threshold;

determine whether the pixel point value exceeds the maximum pixel point threshold; and determine that the projection lens is in a jitter state in response to the pixel point value exceeding the maximum pixel point threshold.

In some embodiments, the driving unit is specifically configured to:

drive the projection lens to adjust the pixel point value along a direction opposite to the movement direction of the pixel point.

In a third aspect, embodiments of the present disclosure provide a projector. The projector includes: a projection lens, and a microcontroller unit configured to control the projection lens to project a projection image; wherein the microcontroller unit is capable of performing the projection image anti jitter method according to the first aspect.

In a fourth aspect, embodiments of the present disclosure provide a computer-readable storage medium, wherein the computer-readable storage medium stores computer-executable instructions, which, when loaded and executed by a computer, cause the computer to perform the method according to the first aspect.

In a fifth aspect, embodiments of the present disclosure further provide a computer program product. The computer program product includes computer programs stored in a computer-readable storage medium. The computer programs include program instructions, which, when loaded and executed by a computer, cause the computer to perform the method according to the first aspect.

Compared with the related art, the present disclosure achieves the following beneficial effects: The embodiments of the present disclosure provide a projection image anti jitter method and apparatus, and a projector. With the projection image anti jitter method, jitter data of a projection lens is captured; jitter characteristic information and offset data are acquired by calculation; and the projection lens is adjusted based on the offset data, thereby achieving anti jitter of a projection image. The projection image anti-jitter method according to the present disclosure is capable of solving the problem of jitter of images in the case that a hand-held projector projects the images.

BRIEF DESCRIPTION OF THE DRAWINGS

One or more embodiments are illustrated by way of example, and not by limitation, in the figures of the accompanying drawings, wherein elements/units and steps having the same reference numeral designations are represented as like elements/units and steps throughout. The drawings are not to scale, unless otherwise disclosed.

DETAILED DESCRIPTION

Figure 1:
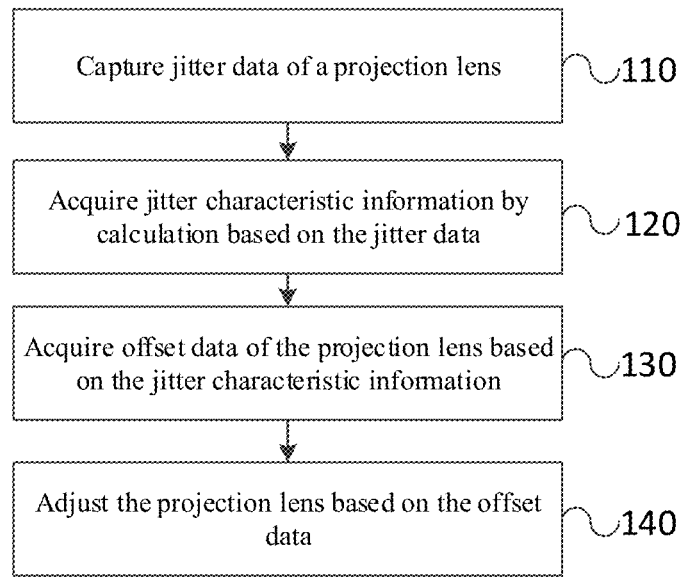
FIG. 1 is a schematic flowchart of a projection image anti jitter method according to an embodiment of the present disclosure.

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For clearer descriptions of the objectives, technical solutions, and advantages of the present disclosure, the present disclosure is further described with reference to specific embodiments and attached drawings. It should be understood that the specific embodiments described herein are only intended to explain the present disclosure instead of limiting the present disclosure.

It should be noted that, in the absence of conflict, embodiments of the present disclosure and features in the embodiments may be incorporated, which all fall within the protection scope of the present disclosure. In addition, although logic function unit division is illustrated in the schematic diagrams of apparatuses, and logic sequences are illustrated in the flowcharts, in some occasions, steps illustrated or described by using modules different from the unit division in the apparatuses or in sequences different from those illustrated.

Unless the specification clearly requires otherwise, throughout the description and the claims, the technical and scientific terms, such as "comprise," "comprising," "include," "including," and the like are to be construed in an inclusive sense as opposed to an exclusive or exhaustive sense. Additionally, the terms used in the specification of the present disclosure are merely for description the embodiments of the present disclosure, but are not intended to limit the present disclosure. As used herein, the term "and/or" in reference to a list of one or more items covers all of the following interpretations of the term: any of the items in the list, all of the items in the list and any combination of the items in the list.

In addition, technical features involved in various embodiments of the present disclosure described hereinafter may be combined as long as these technical features are not in conflict.

When an existing hand-held projector is held by hands for projection, the jitter of a device causes a blurred projected image, exerts an adverse impact on the image, and impairs user's viewing. The effect of anti jitter processing of the hand-held projector is poor, and some hand-held projectors are not subjected to anti jitter processing, which causes a projected image to jitter up and down, and left and right.

Embodiments of the present disclosure provide a projection image anti jitter method and apparatus, and a projector that are capable of adjusting a projection lens according to a jitter frequency of the projection lens, such that the problem of jitter of images in the case that a hand-held projector projects the images is addressed, and the projected image becomes stable and clear. The method according to the embodiments of the present disclosure is applicable to various projection devices which need to project images during the movement, such that the problem that jitter is caused during the projection of images is addressed.

Specifically, hereinafter, the embodiments of the present disclosure are further illustrated with reference to the accompanying drawings.

First Embodiment

An embodiment of the present disclosure provides a projection image anti jitter method. Referring to FIG. 1, a schematic flowchart of a projection image anti jitter method according to an embodiment of the present disclosure is illustrated. The method includes, but is not limited to: the following steps.

In step 110, jitter data of a projection lens is captured.

In an embodiment of the present disclosure, since the projection lens is adjusted according to a jitter frequency of the projection lens, the jitter data of the projection lens needs to be firstly captured. Specifically, an acceleration and an angular velocity of jitter of the projection lens may be sampled, and hence offset data of the projection lens is acquired by further analyzing the acceleration and the angular velocity of jitter of the projection lens.

In addition, a sampling frequency and a sampling speed need to be adjusted according to actual conditions in response to capturing the jitter data of the projection lens. Specifically, in the case that it is found that a jitter amplitude of the projection lens exceeds a defined compensation range, that is, in the case that the jitter amplitude of the projection lens exceeds a maximum compensation amplitude capable of adjusting the projection lens, the sampling frequency and a compensation frequency of the projection lens need to be adjusted.

For example, in the case that the compensation amplitude of the projection lens is controlled within 0.2 to 0.3 degrees, and the sampling starts, the sampling frequency is one sampling per second; in the case that the jitter frequency of the projection lens acquired by sampling at this time is 1 degree per second, that is, the jitter amplitude of the projection lens is greater, the sampling frequency needs to be accelerated, for example, the sampling frequency is adjusted to five samplings per second, then the jitter frequency of the projection lens acquired by sampling is 0.2 degrees per second. Meanwhile, the compensation frequency of the projection lens is adjusted to be consistent with the sampling frequency, thereby achieving the adjustment of the projection lens within a compensation amplitude range.

Further, in the case that different users control the projection lens to project an image, the jitter frequency may also be changed; or in the case that the projection lens is held and controlled to project an image by the same user in different time periods, the jitter frequency may also be changed. Likewise, for the above described cases, the sampling frequency and the compensation frequency of the projection lens are further adjusted by determining whether the jitter amplitude exceeds the compensation amplitude range.

In step 120, jitter characteristic information is acquired by calculation based on the jitter data.

In an embodiment of the present disclosure, in the case that the jitter data is acquired, that is, the acceleration and the angular velocity of jitter of the projection lens are acquired, the jitter characteristic information of the projection lens needs to be analyzed and extracted, and the offset data of the projection lens is acquired by calculation based on the jitter characteristic information. The jitter characteristic information includes a variation parameter of an Euler angle of the projection lens. Specifically, reference is made to FIG. 2 and the related method and description.

In step 130, offset data of the projection lens is acquired based on the jitter characteristic information.

In an embodiment of the present disclosure, the offset data of the projection lens is acquired by mapping based on the jitter characteristic information, that is, the variation parameter of the Euler angle of the projection lens. Further, the projection lens is adjusted based on the offset data.

In step 140, the projection lens is adjusted based on the offset data.

In an embodiment of the present disclosure, in the case that the offset data of the projection lens is acquired, a direction and an angle of the projection lens are adjusted based on an offset direction and an offset angle in the offset data, or based on an offset direction and an offset distance in the offset data. Specifically, the projection lens is driven, in a direction opposite to the offset direction, and at the offset angle, to adjust the projection direction and the angle thereof.

An embodiment of the present disclosure provides a projection image anti jitter method. With the projection image anti jitter method, jitter data of a projection lens is captured; jitter characteristic information and offset data are acquired by calculation; and the projection image is adjusted based on the offset data, thereby achieving anti jitter of the projection image. The projection image anti jitter method according to the present disclosure is capable of solving the problem of jitter of images in the case that a hand-held projector projects the images.

Figure 2:
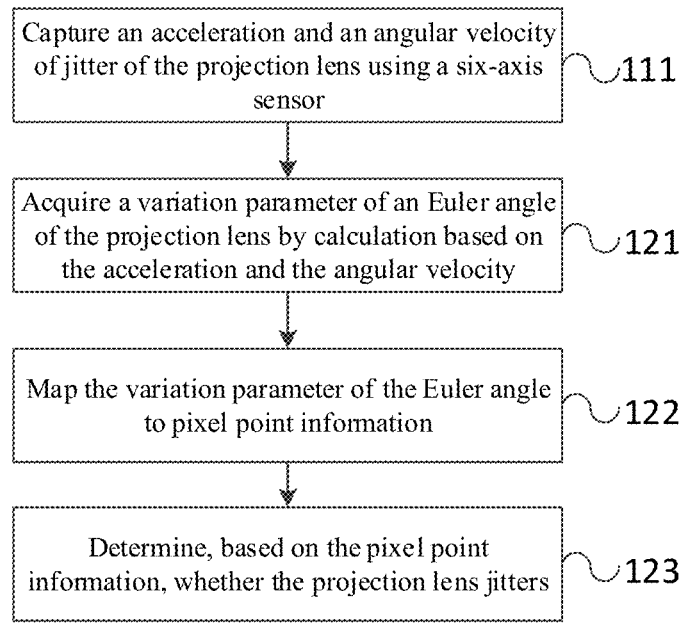
FIG. 2 is a schematic sub-flowchart of step 110 and step 120 in the method in FIG. 1.

In some embodiments, referring to FIG. 2, a schematic flowchart of step 110 and step 120 in the method in FIG. 1 is illustrated, wherein step 110 includes, but is not limited to, the following steps.

In step 111, an acceleration and an angular velocity of jitter of the projection lens are captured using a six-axis sensor.

In an embodiment of the present disclosure, the acceleration and the angular velocity of jitter of the projection lens are captured using the six-axis sensor arranged in the projection lens, or arranged in a tripod head integrally connected to the projection lens. Specifically, the acceleration of jitter of the projection lens is captured using the six-axis sensor, and the angular velocity of jitter of the projection lens is captured using a gyroscope. The acceleration and the angular velocity captured by the six-axis sensor may be represented as the acceleration and the angular velocity in three directions in a spatial right-angle coordination system, wherein any two of the three directions are perpendicular to each other.

Still referring to FIG. 2, step 120 includes, but is not limited to, the following steps.

In step 121, a variation parameter of an Euler angle of the projection lens is acquired by calculation based on the acceleration and the angular velocity. The variation parameter of the Euler angle includes a yaw angle, a pitch angle, and a roll angle.

In an embodiment of the present disclosure, the acceleration and the angular velocity captured by the six-axis sensor may be represented as the acceleration and the angular velocity in three directions in the spatial right-angle coordination system. The acceleration and the angular velocity in the three directions are constantly varied with jitter of the projection lens. Therefore, three time-varying variation parameters of the Euler angle, including the yaw angle, the pitch angle, and the roll angle, may be correspondingly calculated based on the acceleration and the angular velocity in three directions variable with time in the spatial right-angle coordination system.

In step 122, the variation parameter of the Euler angle is mapped to pixel point information.

In an embodiment of the present disclosure, the three time-varying variation parameters of the Euler angle are mapped to the pixel point information in the three directions, and a jitter direction and the jitter amplitude of the projection lens are characterized by the pixel point information.

Specifically, the variation parameter of the yaw angle is mapped to information of a first pixel point movable in an X axis; the variation parameter of the pitch angle is mapped to information of a second pixel point movable in a Y axis; and the variation parameter of the roll angle is mapped to information of a third pixel point movable in a Z axis.

In step 123, whether the projection lens jitters is determine based on the pixel point information. The pixel point information includes a movement direction and a pixel point value of the pixel point, wherein the pixel point value is a distance by which the pixel point moves.

In an embodiment of the present disclosure, the movement direction of the pixel point corresponds to the jitter direction of the projection lens, and the pixel point value, that is, the distance by which the pixel point moves, corresponds to the jitter amplitude of the projection lens. Further, the pixel point information may be specifically represented by a spatial vector in an XYZ spatial right-angle coordinate system. The direction of the spatial vector represents the movement direction of the pixel point, and the pixel point value in a spatial direction represents the movement distance of the pixel point. Specifically, the pixel point information may be mathematically characterized according to actual conditions, the pixel point direction and the pixel point value that are in one-to-one correspondence are indexed and stored, which is not limited to the description in the embodiment of the present disclosure.

Figure 3:
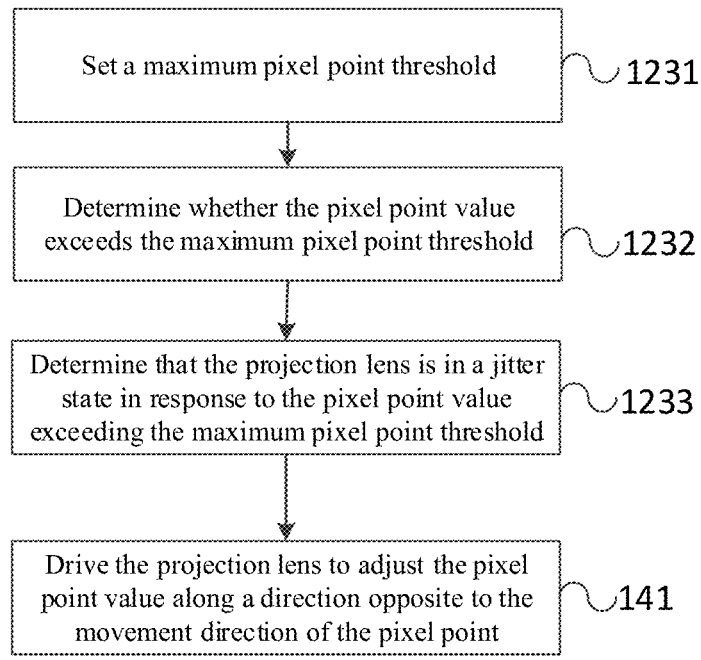
FIG. 3 is a schematic sub-flowchart of step 123 in FIG. 2 and step 140 in the method in FIG. 1.

In some embodiments, referring to FIG. 3, a schematic flowchart of step 123 in FIG. 2 and step 140 in the method in FIG. 1 is illustrated, wherein step 123 includes, but is not limited to, the following steps.

In step 1231, a maximum pixel point threshold is set.

In step 1232, whether the pixel point value exceeds the maximum pixel point threshold is determined. The process skips to step 1233 in response to determining that the pixel point value exceeds the maximum pixel point threshold.

In step 1233, it is determined that the projection lens is in a jitter state in response to the pixel point value exceeding the maximum pixel point threshold.

In an embodiment of the present disclosure, whether the pixel point value exceeds a predetermined threshold is determined by acquiring the pixel point value, whether the projection lens is in a jitter state is determined, and further the projection lens is adjusted, such that the projection lens is capable of projecting an image that is not in jitter.

Specifically, it is determined that an offset is caused to the projection lens due to the jitter of the projection lens in response to determining that the pixel point value does not exceed the maximum pixel point threshold. Further, the projection lens is adjusted using the method described in step 140.

Two cases may be present in response to determining that the pixel point value exceeds the maximum pixel point threshold. First, a current projection lens is in a normal rotating state, and thus the jitter amplitude of the projection lens is greater, and the calculated pixel point value exceeds the threshold. In this case, step 140 does not need to be performed. Second, in the case described in step 110 where a low sampling frequency causes the jitter amplitude to exceed the compensation amplitude range, the sampling frequency and the compensation frequency need to be increased and re-sampling is carried out to improve the jitter amplitude upon increase of the sampling frequency, and then the pixel point value is recalculated, and step 123 is re-performed.

However, in the case that the projection lens rotates normally, the jitter amplitude or a deflection amplitude is relatively greater, and a deflection direction is generally fixed. Therefore, the above two cases may be determined by setting two maximum pixel thresholds. For example, a first maximum pixel point threshold and a second maximum pixel point threshold are set, wherein the second maximum pixel point threshold is greater than/far greater than the first maximum pixel point threshold. It is determined that the jitter amplitude exceeds the compensation amplitude range in response to the pixel point value exceeding the first maximum pixel point threshold and not exceeding the second maximum pixel point threshold. It is determined that the projection lens is normally rotating in response to the pixel point value exceeding the second maximum pixel point threshold.

Alternatively, the jitter/deflection direction within a specific time period may be determined. In the case that the jitter/deflection direction remains unvaried within an error range, it is determined that the jitter amplitude exceeds the compensation amplitude range. In the case that the jitter/deflection direction fails to remain unvaried within the error range or is constantly varying, it is determined that the projection lens is normally rotating.

Still referring to FIG. 3, step 140 includes, but is not limited to, the following steps.

In step 141, the projection lens is driven to adjust the pixel point value along a direction opposite to the movement direction of the pixel point.

In an embodiment of the present disclosure, the projection lens is driven to adjust the pixel point value along the direction opposite to the movement direction of the pixel point, thereby achieving compensation for the jitter of the projection lens. The movement direction of the pixel point corresponds to the jitter direction of the projection lens, and the pixel point value corresponds to a jitter angle or a jitter distance of the projection lens.

Figure 4:
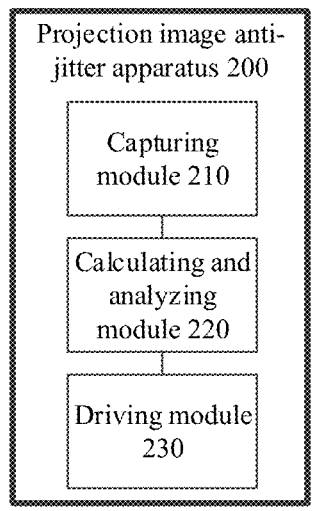
FIG. 4 is a schematic structural diagram of a projection image anti jitter apparatus according to an embodiment of the present disclosure.

An embodiment of the present disclosure further provides a projection image anti jitter apparatus. Referring to FIG. 4, a schematic structural diagram of a projection image anti jitter apparatus 100 according to an embodiment of the present disclosure is illustrated. The apparatus 200 includes a capturing unit 210, a calculating and analyzing unit 220, and a driving unit 230.

The capturing unit 210 is configured to capture jitter data of a projection lens.

In an embodiment of the present disclosure, the capturing unit 210 captures an acceleration and an angular velocity using an MPU6050 six-axis sensor module. Specifically, the six-axis sensor includes a three-axis acceleration sensor configured to capture accelerations in three directions, and a three-axis gyroscope configured to capture angular velocities in the three directions. The MPU6050 six-axis sensor module is originally equipped with a digital motion processor (DMP) hardware acceleration engine. Therefore, the captured acceleration and the angular velocity may be output to the calculating and analyzing unit 220 by an inter-integrated circuit (IIC) interface.

The calculating and analyzing unit 220 is configured to acquire jitter characteristic information by calculation based on the jitter data, and acquire offset data of the projection lens based on the jitter characteristic information.

In an embodiment of the present disclosure, the calculating and analyzing unit 220 may be any one of a microcontroller unit (MCU), a digital signal processing (DSP), and a field-programmable gate array (FPGA), and is configured to receive the acceleration and the angular velocity output by the capturing unit 210, and calculate an Euler angle including a yaw angle, a pitch angle, and a roll angle. Afterwards, the time-varying pitch angle is mapped to pixel point information moving up and down, and the time-varying yaw angle is mapped to pixel point information moving left and right, and the time-varying roll angle is mapped to pixel point information moving forth and back. The terms "up and down," left and right," and "forth and back" represent three directions among which any two are perpendicular to each other, and may be three directions randomly defined in a spatial right-angle coordinate system.

The driving unit 230 is configured to adjust the projection lens based on the offset data.

In an embodiment of the present disclosure, the driving unit 230 modifies a projection parameter based on the pixel point information, and drives the projection lens to move by the pixel point value.

An embodiment of the present disclosure provides a projection image anti jitter apparatus. In the projection image anti jitter apparatus, the capturing unit 210 captures jitter data of a projection lens, and the calculating and analyzing unit 220 calculates jitter characteristic information and offset data, and the driving unit 230 adjusts the projection lens based on the offset data. The apparatus is capable of solving the problem of jitter of images in the case that a hand-held projector projects the images.

In some embodiments, the capturing unit 210 is specifically configured to capture an acceleration and an angular velocity of jitter of the projection lens using a six-axis sensor.

In some embodiments, the calculating and analyzing unit 220 is specifically configured to acquire a variation parameter of an Euler angle of the projection lens by calculation based on the acceleration and the angular velocity. The variation parameter of the Euler angle includes a yaw angle, a pitch angle, and a roll angle that are variable with time.

In some embodiments, the calculating and analyzing unit 220 is specifically configured to: map the variation parameter of the Euler angle to pixel point information; and determine, based on the pixel point information, whether the projection lens jitters; wherein the pixel point information includes a movement direction and a pixel point value of the pixel point, wherein the pixel point value is a distance by which the pixel point moves.

Mapping the variation parameter of the Euler angle to the pixel point information specifically includes: mapping a variation parameter of the yaw angle to information of a first pixel point movable in an X axis; mapping a variation parameter of the pitch angle to information of a second pixel point movable in a Y axis; and mapping a variation parameter of the roll angle to information of a third pixel point movable in a Z axis.

In some embodiments, the calculating and analyzing unit 220 is specifically configured to set a maximum pixel point threshold; determine whether the pixel point value exceeds the maximum pixel point threshold; and determine that the projection lens is in a jitter state in response to the pixel point value exceeding the maximum pixel point threshold.

In some embodiments, the driving unit 230 is specifically configured to drive the projection lens to adjust the pixel point value along a direction opposite to the movement direction of the pixel point.

Figure 5:
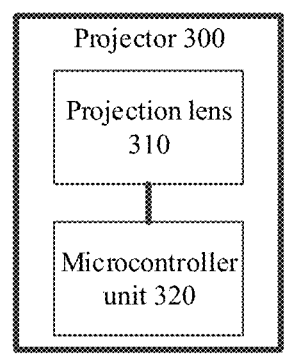
FIG. 5 is a schematic structural diagram of a projector according to an embodiment of the present disclosure.

An embodiment of the present disclosure further provides a projector. Referring to FIG. 5, a schematic structural diagram of a projector 300 according to an embodiment of the present disclosure is illustrated. The projector 300 includes a projection lens 310, a microcontroller unit 320 configured to control the projection lens 310 to project a projection image; wherein the microcontroller unit 320 is capable of performing the projection image anti jitter method according to the above embodiment.

The projection lens 310 is a lens capable of projecting a projection image, and includes, but is not limited to the projection lens described in the above apparatus embodiment. The projection lens 310 is a mechanical device in the projector 300, and configured to output the projection image upon the projection image is processed by calculation by the microcontroller unit 320.

The microcontroller unit 320 is a microcomputer, and is configured to set various parameters, acquire various parameters, store various parameters, receive various information, process various information, and send various information and instructions. The microcontroller unit 320 is configured to capture jitter data of a projection lens; acquire jitter characteristic information and offset data by calculation based on the jitter data, and adjust the projection lens based on the offset data, thereby achieving anti jitter of the projection image.

The microcontroller unit 320 includes, but is not limited to, all the units in the apparatus embodiment as described above. In practice, data transmission/communication/connection between the projection lens 310 and the microcontroller unit 320 may be practiced in a wireless or wired fashion. The projection lens 310 is connected to the microcontroller unit 320 by a bus. The projection lens 310 and the microcontroller unit 320 may be integrated as a single device or may be also more than two independent devices each including one or more units.

The microcontroller unit 320 may perform the projection image anti jitter method according to the embodiments of the present disclosure, has corresponding function units for performing the method, and achieves the corresponding beneficial effects. For technical details that are not illustrated in detail in this embodiment, reference may be made to the description of the projection image anti jitter methods according to the embodiments of the present disclosure.

An embodiment of the present disclosure further provides a computer-readable storage medium.

The computer-readable storage medium stores computer executable instructions, which, when loaded and executed by the at least one processor, for example, the processor 320 as illustrated in FIG. 5, cause the at least one processor to perform the projection image anti jitter method in any of the above method embodiments, for example, performing step S110 to step S140 in the method as illustrated in FIG. 1, step S111 and step S121 to step 123 in the method as illustrated in FIG. 2, step S1231 to step S1233, and step 141 in the method as illustrated in FIG. 3; and implementing the functions of the units 110 to 130 as illustrated in FIG. 4.

According to the above embodiments of the present disclosure, a person skilled in the art may clearly understand that the embodiments of the present disclosure may be implemented by means of software plus a necessary general hardware platform. Persons of ordinary skill in the art may understand that all or part of the steps of the methods in the embodiments may be implemented by a program instructing relevant hardware. The program may be stored in a non-transitory computer-readable storage medium and may be executed by at least one processor. When the program runs, the steps of the methods in the embodiments are performed. The instruction is stored in the microcontroller unit, which may be any microcomputer.

The computer-readable storage medium may perform the projection image anti-jitter method according to the embodiments of the present disclosure, has corresponding function units for performing the method, and achieves the corresponding beneficial effects. For technical details that are not illustrated in detail in this embodiment, reference may be made to the description of the projection image anti jitter methods according to the embodiments of the present disclosure.

An embodiment of the present disclosure further provides a computer program product.

The computer program product includes computer programs stored in a non-volatile computer readable storage medium, the computer programs including program instructions, which, when loaded and executed by a computer, cause the computer to perform the projection image anti jitter method, for example, performing step S110 to step S140 in the method as illustrated in FIG. 1, step S111 and step S121 to step 123 in the method as illustrated in FIG. 2, step S1231 to step S1233, and step 141 in the method as illustrated in FIG. 3; and implementing the functions of the units 110 to 130 as illustrated in FIG. 4.

The product may perform the projection image anti jitter method according to the embodiments of the present disclosure, has corresponding function units for performing the method, and achieves the corresponding beneficial effects. For technical details that are not illustrated in detail in this embodiment, reference may be made to the description of the projection image anti jitter methods according to the embodiments of the present disclosure.

The embodiments of the present disclosure provide a projection image anti jitter method and apparatus, and a projector. With the projection image anti jitter method, jitter data of a projection lens is captured; jitter characteristic information and offset data are acquired by calculation; and the projection image is adjusted based on the offset data. The projection image anti jitter method according to the present disclosure is capable of solving the problem of jitter of images in the case that a hand-held projector projects the images.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A projection image anti jitter method, comprising:
capturing jitter data of a projection lens;
acquiring jitter characteristic information by calculation based on the jitter data;
acquiring offset data of the projection lens based on the jitter characteristic information; and
adjusting the projection lens based on the offset data;
wherein capturing the jitter data of the projection lens comprises:
capturing an acceleration and an angular velocity of jitter of the projection lens using a six-axis sensor;
wherein acquiring the jitter characteristic information by calculation based on the jitter data comprises:
acquiring a variation parameter of an Euler angle of the projection lens by calculation based on the acceleration and the angular velocity; wherein
the variation parameter of the Euler angle comprises a yaw angle, a pitch angle, and a roll angle that are variable with time.

2. The projection image anti-jitter method according to claim 1, wherein acquiring the offset data of the projection lens based on the jitter characteristic information comprises:
mapping the variation parameter of the Euler angle to pixel point information; and determining, based on the pixel point information, whether the projection lens jitters; wherein the pixel point information comprises a movement direction and a pixel point value of the pixel point, the pixel point value being a distance by which the pixel point moves.

3. The projection image anti-jitter method according to claim 2, wherein mapping the variation parameter of the Euler angle to the pixel point information comprises:
mapping a variation parameter of the yaw angle to information of a first pixel point movable in an X axis;
mapping a variation parameter of the pitch angle to information of a second pixel point movable in a Y axis; and
mapping a variation parameter of the roll angle to information of a third pixel point movable in a Z axis.

4. The projection image anti-jitter method according to claim 2, wherein determining, based on the pixel point information, whether the projection lens jitters comprises:
setting a maximum pixel point threshold;
determining whether the pixel point value exceeds the maximum pixel point threshold; and
determining that the projection lens is in a jitter state in response to the pixel point value exceeding the maximum pixel point threshold.

5. The projection image anti-jitter method according to claim 2, wherein adjusting the projection lens based on the offset data comprises:
driving the projection lens to adjust the pixel point value along a direction opposite to the movement direction of the pixel point.

6. A projector, comprising: a projection lens, and a microcontroller unit configured to control the projection lens to project a projection image; wherein the microcontroller unit is capable of performing the projection image anti-jitter method as defined in claim 1.

* * * * *